(12) United States Patent
Pelkus

(10) Patent No.: US 6,773,265 B2
(45) Date of Patent: Aug. 10, 2004

(54) ELECTRONIC SIMULATOR

(76) Inventor: Adrian Pelkus, 419 Borden Cir., San Marcos, CA (US) 92069

( * ) Notice: Subject to any disclaimer, the term of this patent is extended or adjusted under 35 U.S.C. 154(b) by 0 days.

(21) Appl. No.: 10/300,863

(22) Filed: Nov. 8, 2002

(65) Prior Publication Data

US 2003/0124495 A1 Jul. 3, 2003

Related U.S. Application Data

(60) Provisional application No. 60/331,240, filed on Nov. 13, 2001.

(51) Int. Cl.$^7$ .............................................. G09B 23/18
(52) U.S. Cl. ....................................................... 434/301
(58) Field of Search ............................... 434/107, 276, 434/300, 301, 302, 303

(56) References Cited

U.S. PATENT DOCUMENTS

| | | | | |
|---|---|---|---|---|
| 1,989,878 A | * | 2/1935 | Mooney | 434/107 |
| 3,878,624 A | * | 4/1975 | DeFelice | 434/300 |
| 4,213,253 A | | 7/1980 | Gudelis | |
| 5,004,424 A | * | 4/1991 | Larminie | 434/301 |
| 5,049,080 A | * | 9/1991 | Kriebel et al. | 434/300 |
| 5,154,615 A | * | 10/1992 | Joubert | 434/301 |
| 6,561,810 B1 | * | 5/2003 | Schellhardt et al. | 434/126 |
| 6,589,683 B2 | * | 7/2003 | Staats, III | 429/34 |

OTHER PUBLICATIONS

Hannelore Schwedes and Roland Paatz, "The process of Analogous Thinking and Learning", Apr. 2002 [retrieved online Sep. 15, 2003].*

Stella Vosniadou, "Analogies as Tools in Teaching and Learning Science", PS2–F Symposium, 2001 [retrieved online Sep. 15, 2003].*

Hans U. Fuchs, "A Systems View of Natural Processes: Teaching Physics the System Dynamics Way", 1999 [retrieved online Sep. 15, 2003].*

2002 IEEE 33rd Annual IEEE Power Electronics Specialists Conference, Proceedings (Catalog No. 02CH37289) pp 443–448 vol. 2.

* cited by examiner

*Primary Examiner*—Kurt Fernstrom

(57) ABSTRACT

The device described is an Electronic Simulator for use as a teaching aid. This device uses fluid with suspended particles representing electrons that can be seen flowing through the transparent parts. This hydraulic based teaching aid visually demonstrates electronic principles including but not limited to; voltage, current, circuit path, resistance, capacitance, and semiconductors. Battery, Capacitor, Conductor, Diode, Resistor, Switch and Transistor functions are all simulated with quick connected transparent hydraulic components. A flow meter measures current Amps. A pressure gauge measures Volts Seeing the "electrons" flow thru the transparent components teaches the basic principles of electronics quickly and easily. A small air pump serves to charge the Battery. When pneumatically pressurized, the Battery supplies the hydraulic force to push the particle suspended fluid through the different components. As a teaching aid, the electronic simulator includes an instructional booklet and interactive CD that provides various circuit configuration connection diagrams.

5 Claims, 7 Drawing Sheets

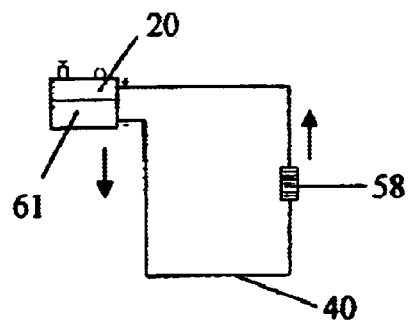
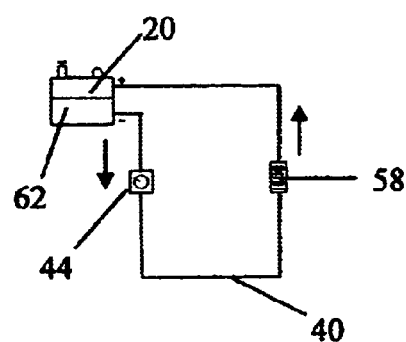
FIG. 8
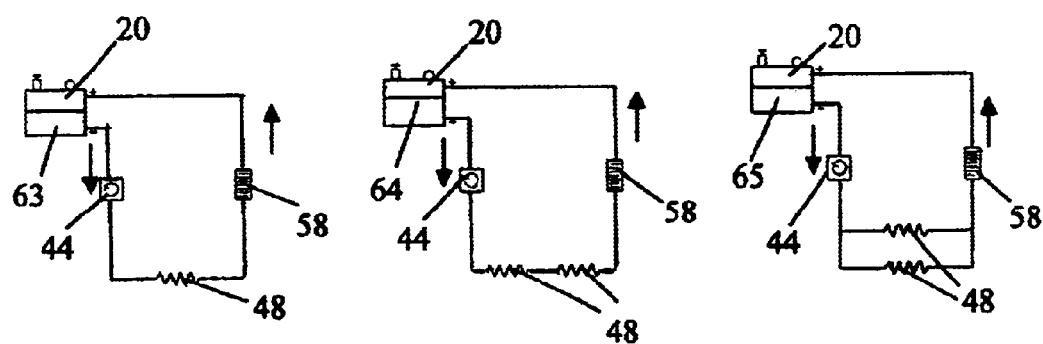

ELECTRONIC SIMULATOR

CROSS-REFERENCE TO RELATED APPLICATIONS

This application claims the benefit of priority from U.S. Provisional Application Serial No. 60/331,240 filed Nov. 13, 2001. The entirety that application is herein incorporated by reference.

FIELD OF THE INVENTION

The present invention relates to a simulator used to teach electronics. In particular, the invention relates to a visual electronic teaching method using liquid holding suspended particles flowing through transparent parts to visually represent electric current flowing through various electronic components.

BACKGROUND OF THE INVENTION

Various training methods and devices have been developed in the past for teaching electronics. Types of devices include simulators that use active electronic components and meteorology to allow the student to build and practice with live electronic circuits. Another teaching method uses computers to design and test electronic circuits in virtual reality. These approaches to teaching electronics require the student be knowledgeable of math, computers and physics as a prerequisite to understanding the dynamics of the circuits.

It is known that electronics is becoming more and more a part of everyday life, yet so few are educated to understand even the basic principles. It would be a benefit to people to have a simpler method of learning electronics: a visual electronic simulator that allows the student to see the principles of electronics in transparent operation.

SUMMARY OF THE INVENTION

It is thus an object of this invention to provide a method of teaching electronics that includes the utilization of an electronic simulator that uses liquid holding suspended particles flowing through transparent parts to represent electric current flowing through various electronic components; the transparent parts simulate electronic component counterparts.

Accordingly, this invention provides the functional hydraulic equivalents of components commonly used in electronic circuits; the battery; the conductor; the resistor; the capacitor; the diode; the transistor; the switch; that can be connected in various configurations to best demonstrate the basic principles of electronics including voltage; current flow; resistance; capacitance; semiconductors; power generation and storage.

An instructional booklet and interactive CD that comes with the visual electric simulator give the instructor or student the directions as to the component configurations that can be quick connected, the process in which to charge the battery and the meaning of the simulated electronic principles being visually demonstrated.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 8 is a diagram of five separate circuit configurations that may be provided in an instructional booklet and interactive CD.

DETAILED DESCRIPTION OF PREFERRED EMBODIMENTS

Figure 1:
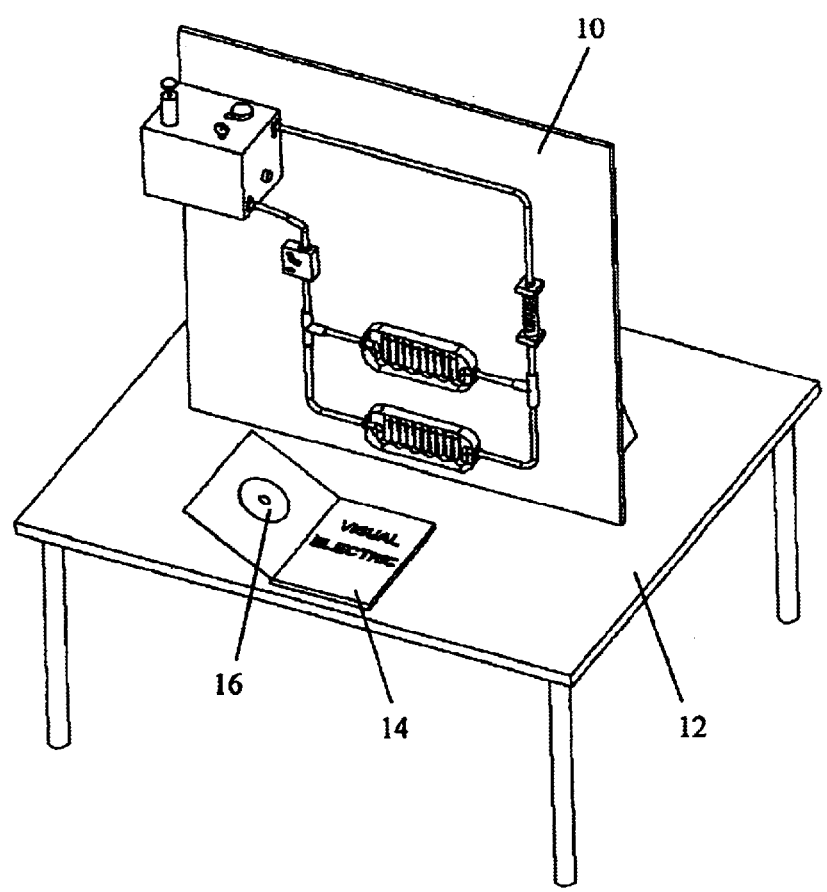
FIG. 1 is a perspective view of an exemplary embodiment of a visual electronic training method and system incorporating a electronic simulator 10.

Referring more particularly to the illustration FIG. 1 a perspective view is shown of an exemplary embodiment of the visual electronic training method and system incorporating the electronic simulator 10, which may sit on a table 12. Accompanying the electronic simulator 10 is an instructional booklet 14 and interactive CD 16 that comes with the visual electronic simulator, either of which give the instructor or student the directions as to the component configurations (as shown in FIG. 8) that can be quick connected, the process in which to charge the battery and the meaning of the simulated electronic principles being visually demonstrated. When the selected circuit is connected together, the next step will be the process in which to charge the battery 20.

Figure 2:
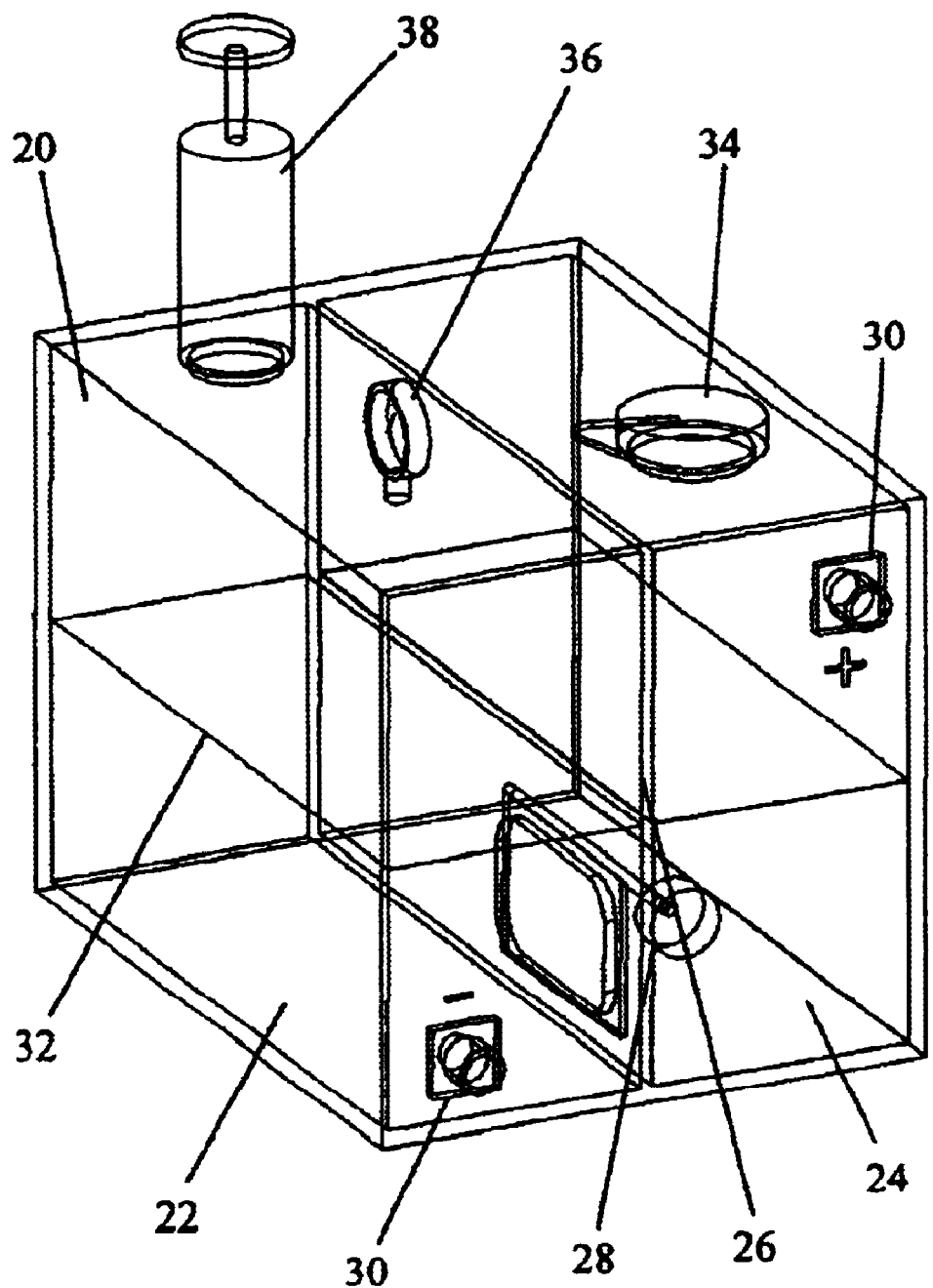
FIG. 2 is a perspective view of an exemplary embodiment of a transparent battery simulator, which may be used to simulate the powering of the other components of an electronic simulator.

Referring more particularly to the illustration FIG. 2 a perspective view of an exemplary embodiment of a transparent hydraulic battery simulator 20 is shown. The battery simulator 20 is made from clear plastic and represents the device that is used to simulate the power supplied to the components of the electronic simulator 10. The battery simulator 20 is comprised of two compartments, a supply side 22 and a return side 24 separated by a dividing wall 26. On top of the clear plastic enclosure is the fluid fill cap 34. The battery charging process begins with opening the vented fluid fill cap 34 and filling the return 24 side of the battery simulator 20 with liquid holding suspended particles 32. The vented fluid fill cap 34 is then closed. Next a fill valve 28 mounted on the dividing wall 26 is opened allowing the liquid holding suspended particles 32 to transfer between the two compartments. This valve is closed when both compartment 22 and 24 fluid levels are equal. On top of the clear plastic enclosure are a pressure gauge 36 and an air pump 38. The air pump 38 is used to pressurize or "charge" the battery simulator 20 until the pressure gauge 36 displays the desired reading. The pressure gauge 36 is reading air pressure, which is displayed as VOLTS. A quick connect fitting 30 is used for fluid inlet to the return 24 side and outlet from the supply 22 side marked "+" and "−".

Figure 3:
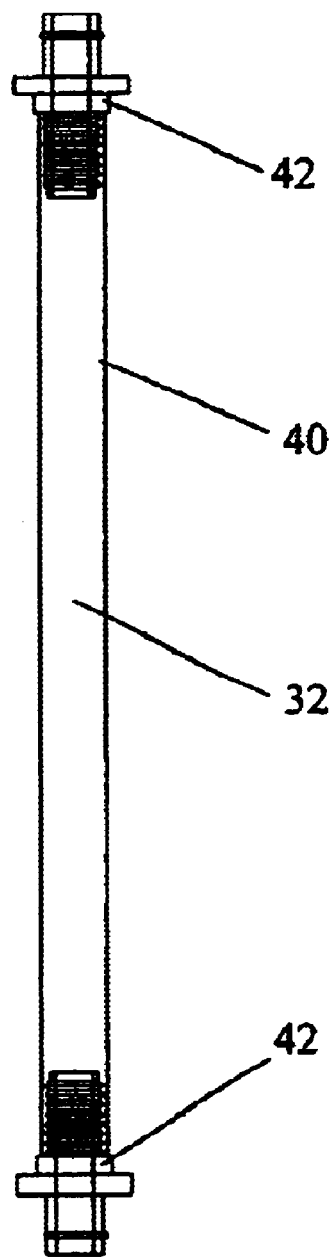
FIG. 3 is an illustration of a transparent conductor simulator.

FIG. 3 shows a conductor simulator. The conductor simulator can be made of transparent plastic tubing 40 with ends that are fitted with quick connect fittings 42. Liquid articles 32 flow from the battery simulator 20 through the conductor to simulate the flow of current.

Figure 4:
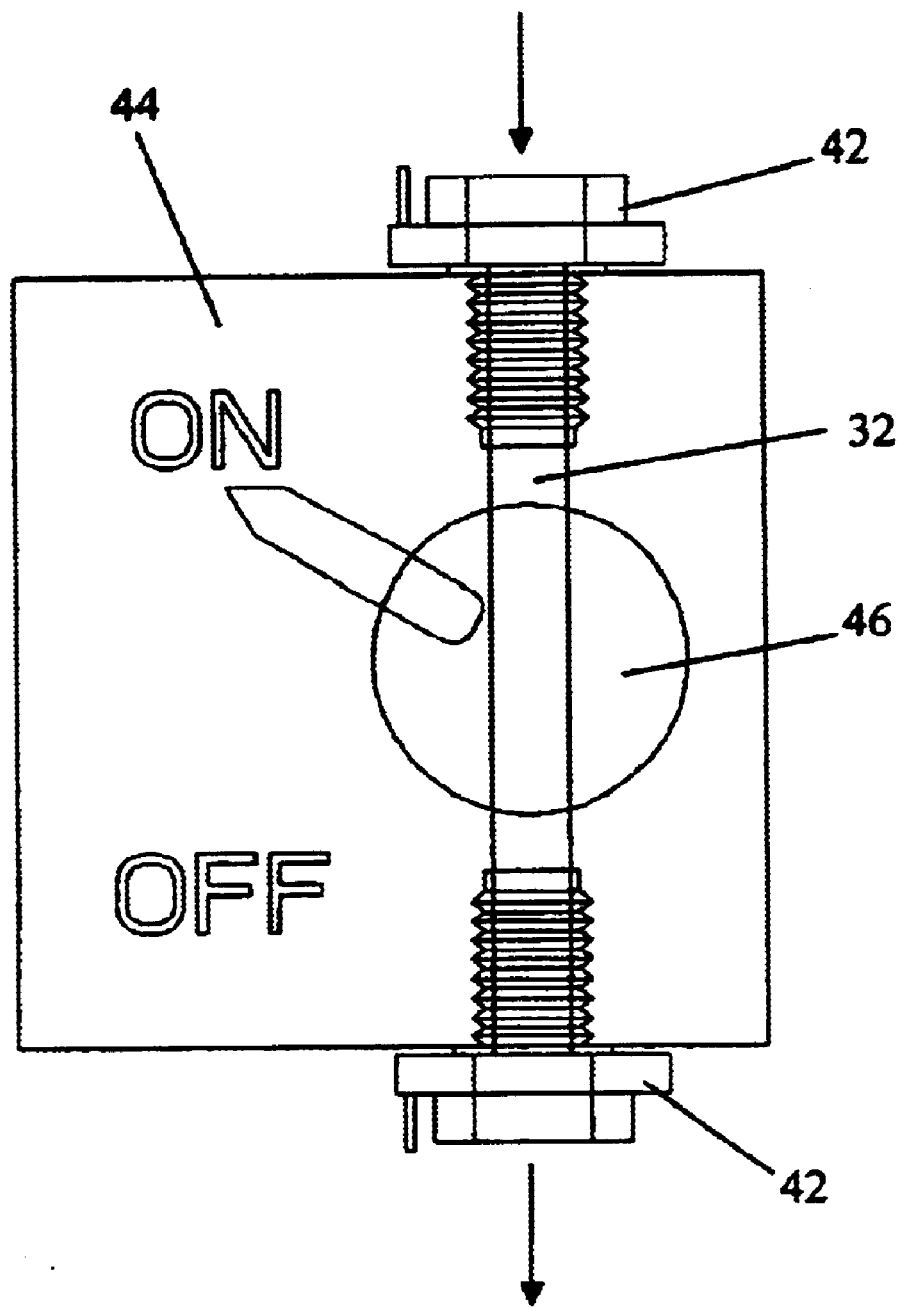
FIG. 4 is an illustration of a transparent switch simulator.

FIG. 4 shows a transparent hydraulic switch simulator 44, which can be made of clear plastic and can contain the liquid holding suspended particles 32. The ends of the switch simulator 44 can include quick connect fittings 42. Turning the valve body 46 controls the flow of the liquid holding suspended particles 32.

Figure 5:
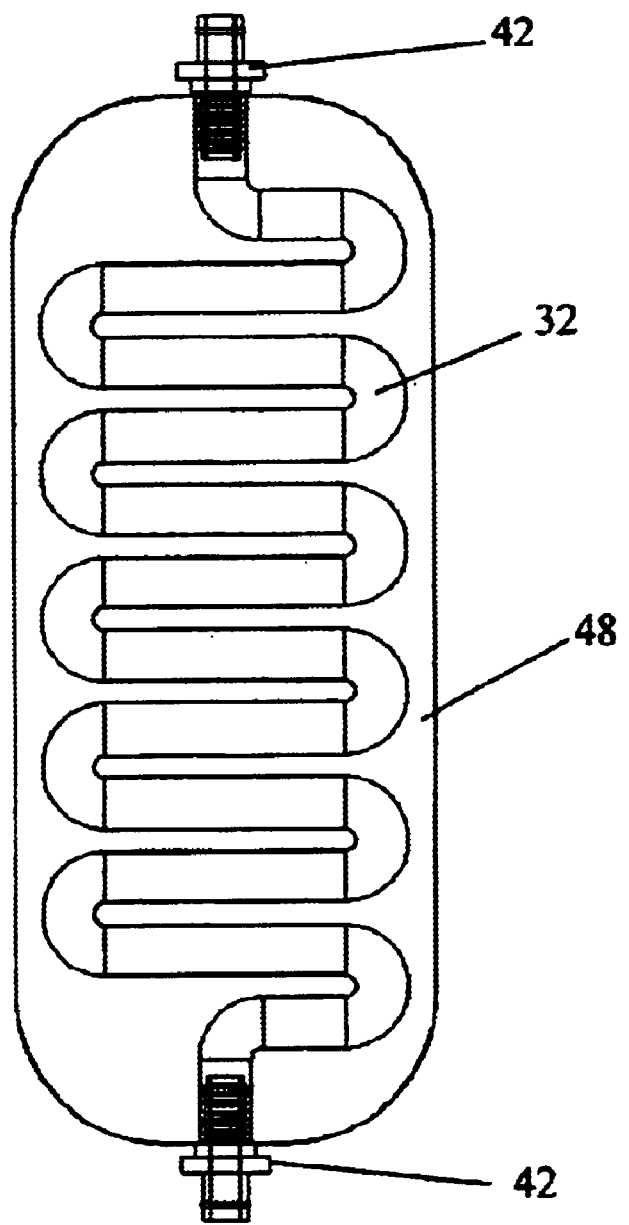
FIG. 5 is an illustration of a resistor simulator.

FIG. 5 depicts a transparent hydraulic resistor simulator 48, which can be made of a clear elastic material. It can contain the liquid holding suspended particles 32. The ends of the resistor simulator 48 are fitted with quick connect fittings 42.

Figure 6:
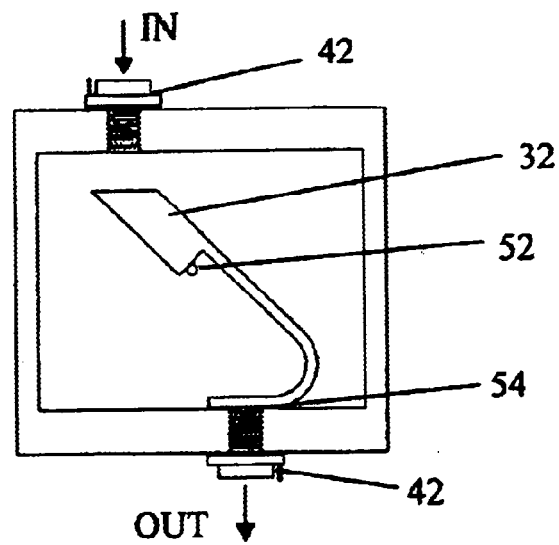
FIG. 6 is an illustration of a capacitor simulator.

FIG. 6 shows a transparent hydraulic capacitor simulator 50, which can be made of a clear elastic material. The capacitor simulator 50 can include a pivoting valve 54 and can also contain the liquid holding suspended particles 32. The ends of the capacitor can be fitted with quick connect fittings 42.

Figure 7:
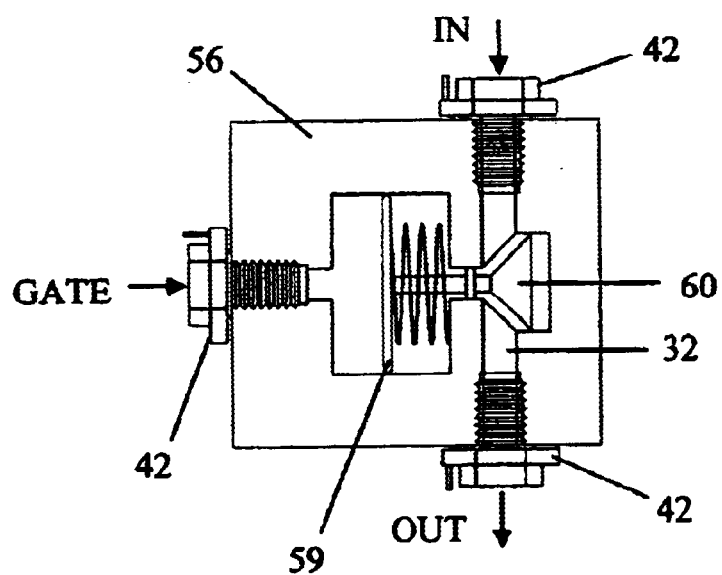
FIG. 7 is an illustration of a transistor simulator.

FIG. 7 depicts a transparent hydraulic transistor 56, which can be made of a clear plastic material. The transistor can include a valve 60 and a diaphragm 58. The transistor can receive the liquid holding suspended particles 32 through quick connect fitting 42 at one end and drain the liquid through quick connect fitting 42 at its other end as depicted in FIG. 7.

Referencing FIG. 8 circuit configuration 64 as a typical example, the visual electronic simulator 10 actively visibly demonstrates electronic principles by using the flow of liquid holding suspended particles 32 supplied by the "charged" battery 20. The fluid flow representing the electric current flow begins when the switch 44 is turned on by twisting the valve 46 to the open position. The air pressure in the battery 20 will push the liquid holding suspended particles 32 out the quick connect fitting 42 on the supply 22 side, and through-the conductor 40. The flow will continue through the switch 44 and next it will visibly flow through the resistors 48 and next through the flow meter 58. The flow measured through the flow meter 58 represents AMPS. The fluid then continues through another conductor 40, which connects the circuit to the battery 20 return 24 side. The return 24 side reservoirs the returned liquid holding suspended particles 32. Flow stops when the switch 44 is turned off by twisting the valve 46 to the closed position, or when the battery 20 is drained of pressure representing voltage being drained. The battery 20 is then "recharged" and the entire process is repeated. Thus. circuits are built using the in series flow meter 58 to represent electric current flow. Diagrams 61 and 62 show current flow principles, while diagrams 63, 64, and 65 demonstrate series and parallel electronic resistance principles.

It can be seen from the preceding description that a method of teaching electronics that includes the utilization of an electronic simulator that uses liquid holding suspended particles flowing through transparent parts to represent electric current flowing through various electronic components; the transparent parts acting as functional hydraulic equivalents of their electronic component counterparts, has been provided.

It is noted that the embodiment of the electronic simulator described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not limiting in sense.

What is claimed is:

1. An electronic simulator for teaching electronics comprising:
    a battery simulator capable of holding a fluid substance, the battery simulator comprising a transparent material through which the fluid substance is visible;
    a conductor simulator in fluid communication with the battery, the conductor simulator comprising a transparent material through which the fluid substance is visible;
    a switch simulator in fluid communication with the conductor simulator, the switch simulator comprising a transparent material through which the fluid substance is visible; and
    a resistor simulator in fluid communication with the switch simulator, the resistor simulator comprising a transparent material through which the fluid substance is visible.

2. The electronic simulator of claim 1 further comprising a capacitor simulator in fluid communication with the resistor simulator, the capacitor simulator comprising a transparent material through which the fluid substance is visible.

3. The electronic simulator of claim 2 further comprising a transistor simulator in fluid communication with the capacitor simulator, the transistor simulator comprising a transparent material through which the fluid substance is visible.

4. The electronic simulator of claim 1, wherein the battery, conductor, switch, and resistor simulators are connected to one another with fittings.

5. A system for teaching electronics comprising:
    an electronic simulator comprising:
        a battery simulator capable of holding a fluid substance, the battery simulator comprising a transparent material through which the fluid substance is visible;
        a conductor simulator in fluid communication with the battery, the conductor simulator comprising a transparent material through which the fluid substance is visible;
        a switch simulator in fluid communication with the conductor simulator, the switch simulator comprising a transparent material through which the fluid substance is visible; and
        a resistor simulator in fluid communication with the switch simulator the resistor simulator comprising a transparent material through which the fluid substance is visible;
    an instructional booklet that includes one or more circuit configuration diagrams for use with the electronic simulator; and
    an interactive compact disk that provides one or more circuit configuration diagrams for use with the electronic simulator.

* * * * *